May 15, 1951 M. G. CLAY 2,552,621
COOKING EQUIPMENT
Filed Oct. 17, 1946 2 Sheets-Sheet 1
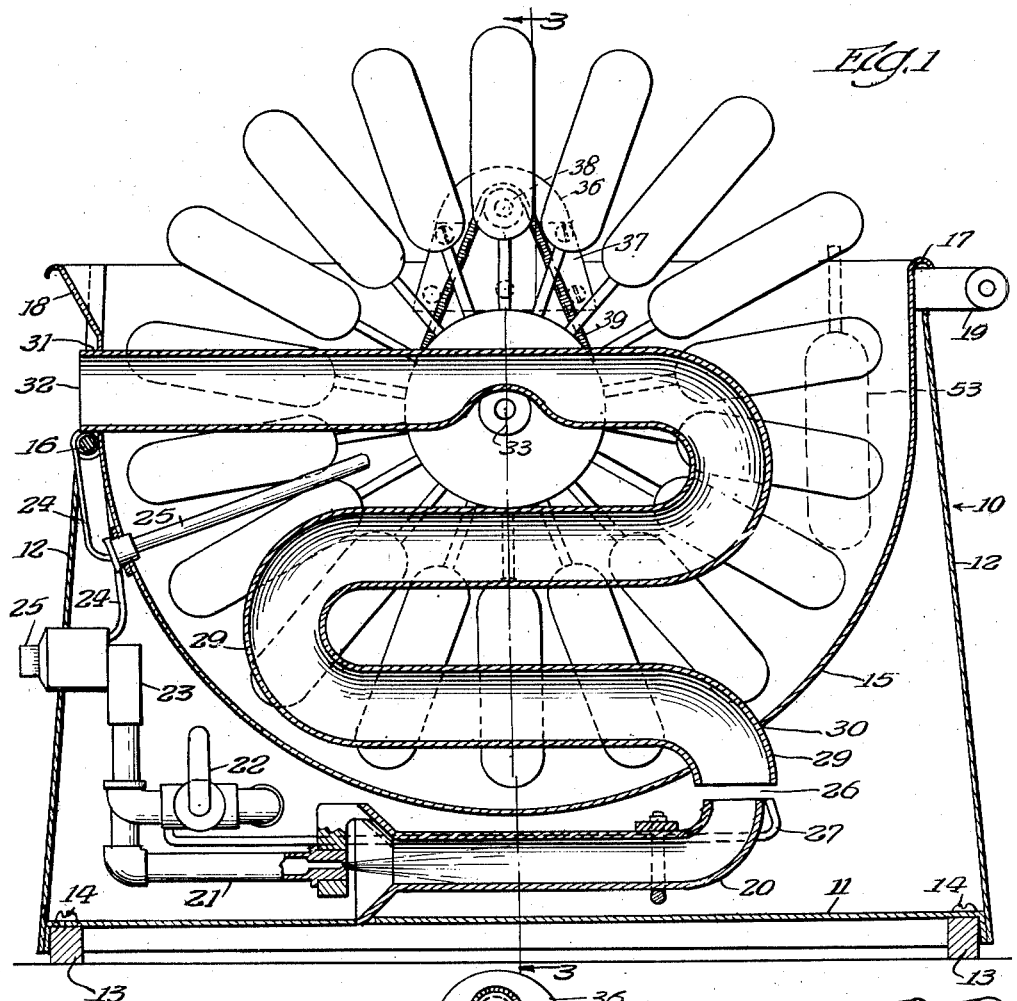
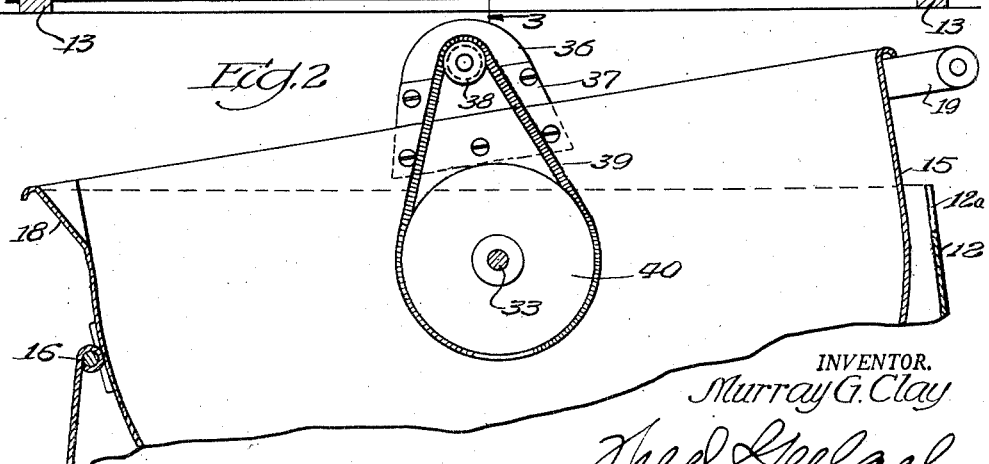
INVENTOR.
Murray G. Clay
By Fred Gerlach
Atty May 15, 1951  M. G. CLAY  2,552,621
COOKING EQUIPMENT
Filed Oct. 17, 1946  2 Sheets-Sheet 2
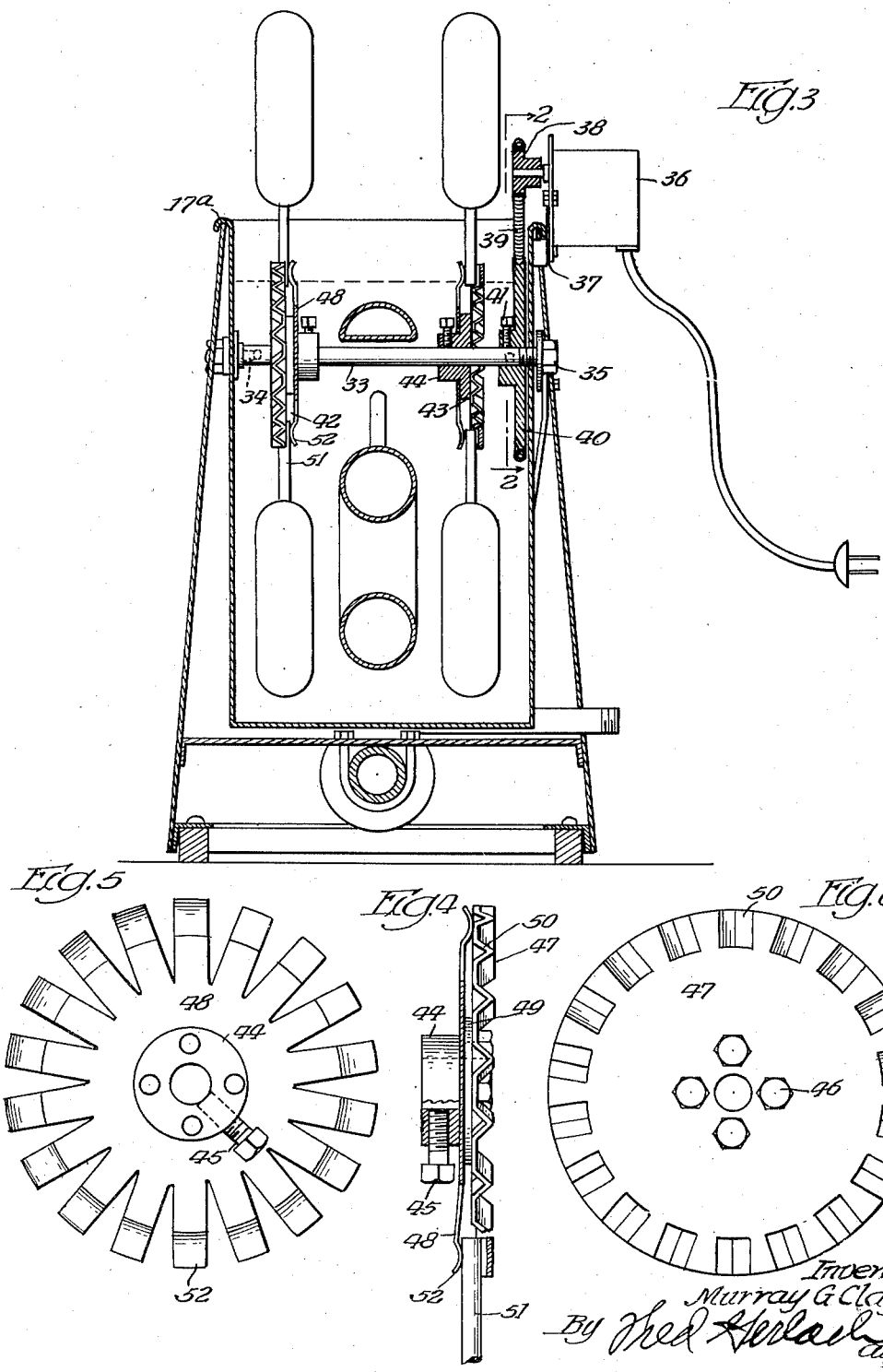

Patented May 15, 1951

2,552,621

UNITED STATES PATENT OFFICE 2,552,621

COOKING EQUIPMENT

Murray G. Clay, River Forest, Ill.

Application October 17, 1946, Serial No. 703,849

2 Claims. (Cl. 99—404)

This invention relates to the culinary art—more particularly the art of frying comestibles in deep cooking fat; and it has to do more specifically with a machine for cooking "pronto pups."

A "pronto pup" is a skinless weiner impaled on a wooden skewer, coated with an edible batter and fried in deep cooking fat.

The principal object of this invention is to provide a machine which will facilitate the cooking of "pronto pups" on a continuous production basis and which will automatically regulate the cooking time—thus ensuring that each "pup" will be cooked exactly right, while further accomplishing the desirable end of delivering the finished "pups" at uniformly timed intervals.

Another object of the invention is to provide, in a machine of the above-indicated character, means for quickly attaching and detaching the "pronto pups" to and from a conveyor which carries them in a continuous train through the hot cooking fat.

Still another object is to provide a machine of the above-stated type wherein the cooking fat can be quickly heated to the required temperature and automatically maintained at that temperature.

An additional object is to provide a deep-frying apparatus for "pronto pups" wherein the fat-holding container can be tilted for the purpose of discharging the liquid fat therefrom.

Other objects and advantages of this invention will become apparent as the detailed description progresses.

In the drawings (2 sheets) which accompany this specification:

Fig. 1 is a vertical sectional view of a machine constructed in accordance with this invention and is representative of a preferred embodiment thereof;

Fig. 2 is a detail view taken at line 2—2 of Fig. 3;

Fig. 3 is a vertical section taken at line 3—3 of Fig. 1;

Fig. 4 is an edgewise view of one of the conveyor wheels;

Fig. 5 is a projection of Fig. 4, showing one side of the conveyor wheel; and

Fig. 6 is a projection of Fig. 4, showing the other side of the conveyor wheel.

The machine illustrated comprises a frame 10 of box-like form, including a sheet metal base plate 11 and sheet metal side walls 12 which are welded to the base plate and also welded together at their adjoining corner edges. Each corner of the base plate is supported on a rubber foot 13—which latter are secured to the base plate by screws 14.

A pot 15 made of sheet metal and having an arcuately curved bottom is hinged at 16 to frame 10 and supported rearwardly and at its two sides on the adjacent upper edges of side walls 12, as depicted at 17 in Fig. 1 and at 17a in Fig. 3. Said pot is designed to hold a quantity of cooking fat and is provided with a pouring spout 18 and a handle 19 opposite the spout for tilting the pot about its hinge 16 whereby to empty the same. Notches 12a in side wall 12 accommodate handle 19 when pot 15 is in its normal position.

Mounted within frame 10 and below pot 15 is a gas burner 20 which is connected by way of piping 21 and cut-off valve 22 to a source of supply. Included in the piping 21 is a thermostatically controlled valve 23 which is connected through a capillary 24 to a thermostat bulb 25—which latter projects into the interior of pot 15 and is secured to the wall thereof. The thermostatic valve 23 is provided with a manually adjustable dial 25 by means of which it can be set to cut off the gas whenever the temperature within the pot reaches a desired maximum value. Combustion takes place at 26 and the burner is relighted after each extinction by means of a pilot flame at the open end of a small pilot supply tube 27. The hot gases resulting from combustion occurring at 26 are directed through an S-tube 29 which follows a zig-zag course through pot 15 and thus presents an extensive heat transfer area to the liquid cooking fat therein. The lower end of tube 29 passes through the curved wall of pot 15 and is brazed or otherwise appropriately sealed thereto at 30; and the upper end of said tube similarly passes through the wall of the pot and is sealed to said wall at 31. It will be apparent from Fig. 1 that the buring gas enters tube 29 at point 26 and that the products of combustion are discharged from tube 29 at 32 after a major part of the heat has been transferred to the cooking fat.

A shaft 33 disposed within pot 15 and located concentrically with the curvature of the bottom plate thereof is supported at its two extremities on pivots 34 and 35, respectively, which, in turn, are supported by the side walls of the pot.

A small geared-head motor 36 is attached by means of a plate 37 to one side wall of pot 15 and is equipped with a driving pulley 38 which is connected through a spring belt 39 to a driven pulley 40 affixed to shaft 33 by means of a setscrew 41. Motor 36 is geared down so that pulley 38 is driven at the rate of one revolution per minute; and the drive ratio between pulleys 38 and 40 is such that shaft 33 rotates at the rate of one revolution in five minutes, approximately, Also attached to shaft 33 and rotatable therewith are two conveyor wheels 42 and 43—so called because they serve to convey the "pronto pups" through the hot cooking fat. Wheels 42 and 43 may be of identical construction, and one of them is shown in detail in Figs. 4–6. Each wheel comprises a hub 44 bored to fit shaft 33 and provided with a setscrew 45 for locking the wheel to the shaft. Attached to one end of hub 44 by means of four capscrews 46 is an assembly comprising a metal disc 47, a spring spider 48 and a washer 49 which serves as a spacer between parts 47 and 48. Disc 47 is crimped at its periphery to form a number of V-shaped depressions or pockets 50—eighteen such pockets being provided in this instance—each of which is adapted to receive one end of a skewer 51 (see Fig. 4) forming a part of a "pronto pup." The spring spider 48 comprises a group of radially projecting spring fingers 52, corresponding numerically to the V-shaped pockets 50; and each such spring finger is situated adjacent one of said pockets in such manner as to bear against the side of an inserted skewer and to co-operate with its associated pocket to grip the skewer and thus hold the "pronto pup" in radially extended posture, as clearly depicted in Figs. 1 and 3. Each spring finger 52 is curved at its tip, as illustrated in Fig. 4, to facilitate insertion of skewers.

In operation, enough cooking fat is placed in pot 15 to fill the same to a level corresponding approximately to the bottom of pouring spout 18. This is heated to a temperature of 325° F. and maintained at that temperature by thermostatic control. When the fat has reached the prescribed temperature the gas is automatically cut off by the thermostat and thereupon the operator starts motor 36, thus setting the conveyor wheels into rotation at the rate of about one revolution in five minutes. The machine is then ready to receive uncooked "pronto pups."

The preparation of a "pronto pup" for application to a conveyor wheel consists in impaling a weiner on a skewer, end-to-end, dipping the weiner into a batch of "pronto pup batter," twisting the skewer and weiner so as to prevent the batter dribbling off, and immediately dipping the coated weiner into hot fat in pot 15, as indicated at 53 in Fig. 1, so as to set the batter. The "pronto pups" thus prepared are attached, one at a time, to one or the other conveyor wheel; and as the wheels slowly revolve the "pronto pups" are immersed in the hot fat and kept immersed about 3½ minutes. When they emerge from the hot fat they are thoroughly cooked to a golden brown color and are ready to be eaten.

By heating the cooking fat through S-tube 29 instead of directing the gas flame against the bottom of the pot 15, I have avoided the possibility of charring any residue of fat lying in the bottom of the pot when the latter is nearly empty.

Instead of the spring belt drive connecting motor 36 with shaft 33, I could employ a positive drive such, for example, as a chain and sprocket drive; but a material advantage accrues from the use of a spring belt or other non-positive drive in that the drive is enabled to slip in event of the "pronto pups" becoming jammed as a result of accumulated residue in the pot.

It will be self-evident that the machine can be built to accommodate as many conveyor wheels as may be considered desirable—which, of course, depends upon the demand for "pronto pups" in each instance. Obviously, it is not necessary to use all the conveyor wheels simultaneously and, therefore, production can be regulated over a wide range when several conveyor wheels are included in a machine.

It will be apparent that many modifications may be made within the scope and spirit of my invention, and I do not wish to be limited except as indicated by the terms of the appended claims.

What I claim as new and desire to secure by Letters Patent is:

1. Cooking equipment of the class described, comprising: a pot adapted to contain a pool of cooking fat, means for maintaining the pool of fat within a predetermined temperature range, a shaft mounted interiorly of said pot, means for slowly rotating said shaft, and a conveyor wheel mounted on and rotatable with said shaft, said wheel comprising a hub, a disc and a spring spider, said disc and spider being carried by said hub and co-axial therewith, said disc having a plurality of circumferentially spaced pockets on its peripheral portion, said spider having a plurality of radially extending spring fingers each of which is disposed opposite one of said pockets and operative conjointly with its associated pocket to yieldably grip one end of a skewer and to hold the skewer so that it projects radially from the wheel.

2. In apparatus for cooking "pronto pups," a pot adapted to contain a pool of cooking fat, means for heating the cooking fat therein, a shaft disposed within said pot, means for slowly rotating said shaft, and a plurality of conveyor wheels mounted on said shaft in spaced relation, each of said wheels comprising a hub secured to the shaft and an assembly secured to one end of the hub and consisting of a disc, a spring spider and a spacer interposed between said disc and spider, said disc and spider being disposed in face-to-face relation concentrically with said shaft, said disc having a plurality of radially extending V-shaped peripheral indentations, each forming a pocket adapted to receive the free end of the skewer of a "pronto pup," said spider having a plurality of radially extending spring fingers, each associated individually with one of said pockets and co-operative therewith to grippingly engage the skewer.

MURRAY G. CLAY.

REFERENCES CITED

The following references are of record in the file of this patent:

UNITED STATES PATENTS

| Number | Name | Date |
|---|---|---|
| 1,599,805 | Barsam | Sept. 14, 1926 |
| 1,706,491 | Jenkins | Mar. 26, 1929 |
| 1,993,609 | Kennedy | Mar. 5, 1935 |
| 2,053,568 | Levin | Sept. 8, 1936 |
| 2,222,314 | Hersk | Nov. 19, 1940 |
| 2,429,090 | Burt-Wells | Oct. 14, 1947 |